(12) United States Patent
Hunter et al.

(10) Patent No.: US 11,972,399 B2
(45) Date of Patent: Apr. 30, 2024

(54) SYSTEM AND METHOD FOR IMPLEMENTING AN INTERBANK INFORMATION NETWORK

(71) Applicant: JPMorgan Chase Bank, N.A., New York, NY (US)

(72) Inventors: John Corwin Hunter, Lithia, FL (US); Palka S. Patel, Jersey City, NJ (US); Luciane Sant'Anna, Brandon, FL (US); Leticia Pui Sze Lim, New York, NY (US); Tiffany Ashley Wan, New York, NY (US); Elizabeth Polanco Aquino, Brooklyn, NY (US); Samer Falah, Staten Island, NY (US); Sudhir Upadhyay, Edison, NJ (US); Tulasi Movva, Trumbull, CT (US); Suresh Shetty, Monmouth Junction, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 16/279,137

(22) Filed: Feb. 19, 2019

(65) Prior Publication Data
US 2019/0188652 A1 Jun. 20, 2019

Related U.S. Application Data

(63) Continuation of application No. 16/015,709, filed on Jun. 22, 2018.
(Continued)

(51) Int. Cl.
*G06Q 20/02* (2012.01)
*H04L 41/12* (2022.01)
*H04L 67/12* (2022.01)

(52) U.S. Cl.
CPC .......... *G06Q 20/027* (2013.01); *H04L 41/12* (2013.01); *H04L 67/12* (2013.01)

(58) Field of Classification Search
CPC ........ G06Q 20/027; H04L 41/12; H04L 67/12
See application file for complete search history.

(56) References Cited

U.S. PATENT DOCUMENTS

| 7,689,682 B1 | 3/2010 | Eldering |
| 10,318,938 B2 * | 6/2019 | Johnsrud .............. G06Q 20/389 |

(Continued)

FOREIGN PATENT DOCUMENTS

| JP | 2007-512595 | 5/2007 |
| JP | 2012-522319 | 9/2012 |

(Continued)

OTHER PUBLICATIONS

F.Heider, M.Hoerva. (Dec. 2009). "Interbank Lending, Credit-Risk Premia, and Collateral". International Journal of Central Banking. Available: https://www.ijcb.org/journal/ijcb09q4a1.htm. (Year: 2009).*

(Continued)

*Primary Examiner* — Jessica Lemieux
*Assistant Examiner* — Pierre L Maccagno
(74) *Attorney, Agent, or Firm* — Greenblum & Bernstein, P.L.C.

(57) ABSTRACT

The invention relates to creating a secure, decentralized, cloud-based network or physical/virtual infrastructure that enables the payments industry to redefine payment processing and information sharing. The innovative network addresses key pain points by reducing payment delays and touch points, realizing faster and comprehensive payment tracking, real-time sanctions, AML and fraud management tools.

20 Claims, 9 Drawing Sheets

Related U.S. Application Data

(60) Provisional application No. 62/523,429, filed on Jun. 22, 2017.

(56) References Cited

U.S. PATENT DOCUMENTS

| | | | |
|---|---|---|---|
| 10,382,452 B1* | 8/2019 | Dawes | H04L 63/02 |
| 10,423,938 B1* | 9/2019 | Gaeta | G06Q 20/042 |
| 10,496,989 B2* | 12/2019 | Castinado | G06Q 20/38215 |
| 2008/0172314 A1 | 7/2008 | Hahn-Carlson | |
| 2008/0262969 A1* | 10/2008 | Samid | G06Q 20/223 705/64 |
| 2012/0284175 A1* | 11/2012 | Wilson | G06Q 20/10 705/39 |
| 2015/0170112 A1 | 6/2015 | Decastro | |
| 2015/0347990 A1 | 12/2015 | Cobbs | |
| 2016/0337346 A1* | 11/2016 | Momchilov | G06F 21/34 |
| 2017/0132630 A1 | 5/2017 | Castinado | |
| 2017/0148016 A1 | 5/2017 | Davis | |
| 2017/0244757 A1* | 8/2017 | Castinado | H04L 9/3247 |
| 2017/0339250 A1* | 11/2017 | Momchilov | H04L 67/34 |
| 2018/0025435 A1* | 1/2018 | Karame | H04L 9/3236 705/30 |
| 2019/0068373 A1* | 2/2019 | Konduru | H04L 63/0853 |
| 2019/0188652 A1* | 6/2019 | Hunter | H04L 41/12 |
| 2019/0245869 A1* | 8/2019 | Dawes | G06F 3/041 |
| 2019/0295162 A1* | 9/2019 | Wang | H04L 9/0866 |
| 2020/0167773 A1 | 5/2020 | Cervenka et al. | |

FOREIGN PATENT DOCUMENTS

| | | | | |
|---|---|---|---|---|
| WO | WO-2006012346 A1 * | 2/2006 | | G06F 21/316 |
| WO | WO 2017/066715 | 4/2017 | | |

OTHER PUBLICATIONS

International Search Report and The Written Opinion of the International Search Authority dated Sep. 17, 2018 in PCT/US2018/038993.

Chinese Office Action dated Mar. 24, 2023, issued by the Chinese Patent Office in the corresponding Chinese patent Application. No. 201880052582.4.

Bahraini Office Action dated Apr. 20, 2023, issued by the National Patent Office of the Kingdom of Bahrain, in the corresponding Bahraini Application No. 20190282.

Official communication from Japanese Patent Office in JP Patent Application No. 2019-570801, dated Jun. 10, 2022, and English translation thereof.

International Preliminary Report on Patentability and Written Opinion of the International Searching Authority dated Dec. 24, 2019 in PCT/US2018/038993.

* cited by examiner

SYSTEM AND METHOD FOR IMPLEMENTING AN INTERBANK INFORMATION NETWORK

CROSS REFERENCE TO RELATED APPLICATIONS

The subject application is a Continuation Application of U.S. application Ser. No. 16/015,709, filed Jun. 22, 2018, which claims Priority to U.S. Provisional Application No. 62/523,429 filed Jun. 22, 2017, which are hereby incorporated by reference herein in their entirety.

FIELD OF THE INVENTION

The invention relates generally to a system and method for implementing an Interbank Information Network (IIN).

BACKGROUND OF THE INVENTION

Generally, banks require detailed information to perform a full validation for a transaction. When a payment comes in, the payment gets tracked for a variety of different reasons like sanctions, fraud, incorrect amount information, etc. If an issue is detected, current systems require operators and/or client service representatives to manually complete a payment validation. The current process involves multiple participants, intermediaries and usually takes several days to complete. There is no mechanisms for banks to exchange information efficiently and securely for transaction validation and/or other functions.

These and other drawbacks currently exist.

SUMMARY OF THE INVENTION

According to one embodiment, the invention relates to an interbank information network that provides a secure and decentralized network. The system comprises: a first bank node communicatively coupled to a first in-bank system; the first bank node comprises: a client internal system that communicates with application business logic via an application programing interface (API); and a blockchain node that supports a permissioned shared ledger and a private database that contains transactional, customer and personally identifiable information (PII); a second bank node communicatively coupled to a second in-bank system; and an interbank information network that establishes a direct communication channel between the first node and the second node.

Another embodiment of the present invention is directed to a method that implements an interbank information network architecture that provides a secure and decentralized network. The method comprises the steps of: provisioning a first bank node communicatively coupled to a first in-bank system; the first bank node comprises: a client internal system that communicates with application business logic via an application programing interface (API); and a blockchain node that supports a permissioned shared ledger and a private database that contains transactional, customer and personally identifiable information (PII); provisioning a second bank node communicatively coupled to a second in-bank system; and establishing, an interbank information network, a direct communication channel between the first node and the second node.

The system may include a specially programmed computer system comprising one or more computer processors, mobile devices, electronic storage devices, and networks.

The computer implemented system, method and medium described herein provide unique advantages to account holding customers, according to various embodiments of the invention. An embodiment of the present invention is directed to creating a secure and decentralized network that enables the payments industry to redefine payment processing and information sharing. The innovative Interbank Information Network aligns with value proposition expected from distributed ledger technology in correspondent banking. The Interbank Information Network further simplifies operation processing, real-time compliance monitoring, enhanced risk tolerance, and improved client services. The network mitigates operational pain points (e.g., slow, manual, opaque, costly) to drive and increase operational efficiency (e.g., payment validation, fraud control, routing, client service/investigations, reconciliation, messaging, reporting, etc.). These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION OF THE PREFERRED EMBODIMENT(S)

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

Figure 1:
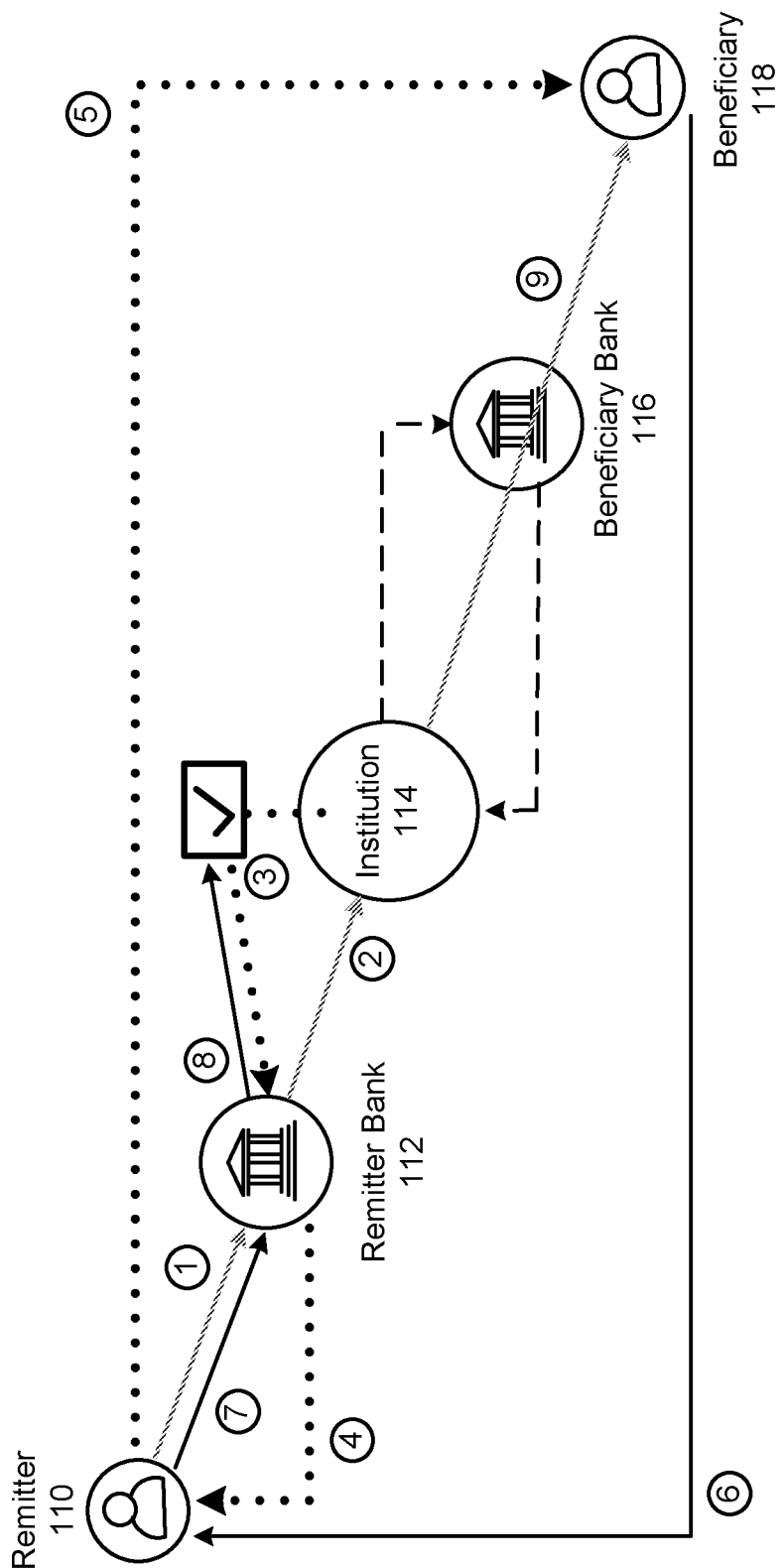
FIG. 1 is an exemplary diagram that illustrates a current inquiry process.

FIG. 1 is an exemplary diagram that illustrates a current inquiry process. As shown in FIG. 1, there are multiple steps that are required to obtain customer-related information when there is an inquiry, such as a payment related compliance inquiry. FIG. 1 illustrates an interaction and exchange of data between and among Remitter 110, Remitter Bank 112, Institution 114, Beneficiary Bank 116 and Beneficiary 118. Interactions may include data request, data exchange and data remittance. As shown in FIG. 1, Institution 114 may have a payment review process that triggers a compliance action. Data may be requested from Remitter Bank 112 and Remitter Bank 112 may then request data from Remitter 110. Remitter 110 and Beneficiary 118 may communicate to obtain Personally Identifiable Information (PII), this process is currently a manual process and may take two to 16 days to complete. Remitter 110 sends data to Remitter Bank 112 and Remitter Bank 112 may then send data to Institution 114. Institution 114 may receive information and make a determination to proceed, further investigate or hold. In addition, each interaction may follow a different non-standard message format and channel with possible translation and/or communication failure points. Because PII is communicated across various individuals and systems, delays are experienced between communications.

With the current banking model, no single bank can facilitate global transfers, requiring money to flow through multiple banks to reach the final beneficiary The current process is opaque, inefficient, and costly. The disjointed flow requires payment related inquiries (e.g., status, fraud, compliance) to back-track the flow of funds to the remitter. Multiple parties result in redundancy as each bank replicates risk management, liquidity management, clearing/settlement, and messaging.

Banks that process payments are required to perform screening against sanction lists in real-time. For potential issues, the current process involves a manual review which may involve querying one or more entities. For example, a current process may involve a remitting bank sending a request to a remitter, who then contacts the beneficiary for additional information. The beneficiary returns the requested information, which is then received by the remitter and sent to the remitter bank. The process may also occur across borders and countries, which adds further complexities.

An embodiment of the present invention is directed to an Interbank Information Network (IIN) where information may be shared through a network that complements existing functions. Sample uses may include fraud (e.g., known fraudster), validation (e.g., account number, name, currency (CCY) and status validation), sanctions (e.g., account details, name, address, date of birth (DOB), entity), tracking (e.g., track and trace payment status), clearing, settlement, advising, fraud monitoring, anti-money laundering, FX market, liquidity lending, node operating risk rating, etc.

An embodiment of the present invention is directed to creating a secure and decentralized network that facilitates and improves information sharing, payment processing, value exchange and other actions. The network may represent a cloud-based network, a physical or virtual infrastructure as well as other flexible network hosting system. The Interbank Information Network simplifies operation processing, real-time compliance monitoring, enhanced risk tolerance, and improved client services. The network mitigates operational pain points (e.g., slow, manual, opaque, costly) to drive and increase operational efficiency (e.g., payment validation, fraud control, routing, client service/investigations, reconciliation, messaging, reporting, etc.); leverages solutions to benefit other global funds transfer that join the distributed ledger technology; and performs concurrent processing for increased throughput. The network manages anti-money laundering (AML) risk prior to processing payment; provides shared "information cloud" to support Straight Through Processing (STP), AML and Office of Foreign Asset Control (OFAC) investigation requests; mitigates the need for re-screening with OFAC Smart Check; and reduces the expense of compliance processing through offering a shared utility model. With enhanced real-time controls in place, the bank may more rapidly expand and take greater risks as client flows may be managed tightly and risky clients may be identified and dealt with timely. The network realizes reduced delays from documentation requirements and enhanced transparency of full end-to-end payment processing from clients.

In addition, Interbank Clearing and Settlement functions optimize treasury liquidity usage and monitoring, improve client services and defend global funds transfer portfolio. Corresponding banking clearing and settlement occurs in different channels and at different times with multiple hops with non-partners creating lack of final settlement visibility interbank. Distributed ledger technology (DLT) network preserves payment atomicity. Real-time visibility of settlement allows improved liquidity visibility that drives better liquidity management. Interbank Clearing and Settlement functions provide predictability, reduce delays from extended hops through reduced global funds transfer intermediaries, realize potential for 24/7 real-time payments, and cheaper deducted fees through reduced intermediaries. First to market provides positioning for additional foreign exchange (FX) revenue corridors. Banks may define how charging options exist in the new infrastructure of an embodiment of the present invention. The network further provides an opportunity for banks to capture an operator fee for processing.

The following descriptions provide different configurations and features according to exemplary embodiments. While certain nomenclature and types of applications/hardware are described, other names and application/hardware usage is possible and the nomenclature provided is done so by way of non-limiting examples only. Further, while particular embodiments are described, it should be appreciated that the features and functions of each embodiment may be combined in any combination as is within the capability of one of ordinary skill in the art. The figures provide additional exemplary details regarding the present invention. It should also be appreciated that these exemplary embodiments are provided as non-limiting examples only.

Various exemplary methods are provided by way of example herein. These methods are exemplary as there are a variety of ways to carry out methods according to the present disclosure. The methods depicted and described can be executed or otherwise performed by one or a combination of various systems and modules. Each block shown in the methods represents one or more processes, decisions, methods or subroutines carried out in the exemplary method, and these processes, decisions, methods or subroutines are not necessarily carried out in the specific order outlined in the methods, nor is each of them required.

Figure 2:
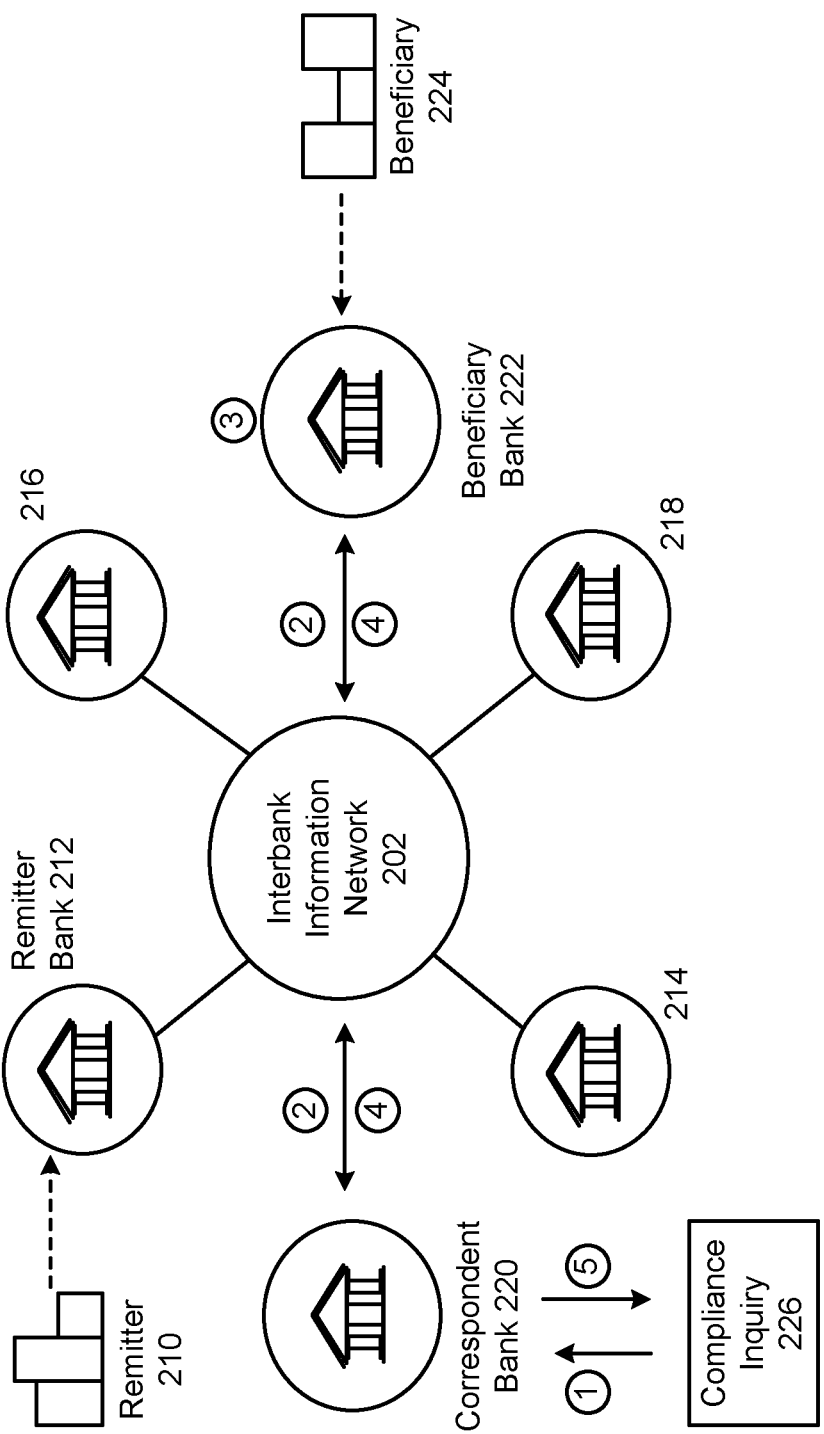
FIG. 2 illustrates a schematic diagram of an Interbank Information Network, according to an embodiment of the present invention.

FIG. 2 illustrates a schematic diagram of an Interbank Information Network, according to an embodiment of the present invention. Existing payment processing functions may be enhanced through the Interbank Information Network that ensures fully validated and formatted payments are entering the payments infrastructure. FIG. 2 illustrates an enhanced collaborative process with numerous benefits to participants within the Interbank Information Network. FIG. 2 illustrates a compliance process with a global network, according to an embodiment of the present invention. As shown in FIG. 2, Interbank Information Network 202 may include various nodes, such as Remitter Bank 212, Node 214, Node 216, Node 218, Corresponding Bank 220 and Beneficiary Bank 222. In this example, Remitter 210 may make a request to Remitter Bank 212 which then communicates to Beneficiary Bank 212 on behalf of Beneficiary 224, through Network 212. Nodes may represent a bank, financial institution, a corporate entity, a regulator, government entity and/or other participant of Network 202. For example, a government entity may access payment audit data and perform other monitoring and supervisory tasks. Different counterparties in a transaction (e.g., nodes including debit nodes, credit nodes as well as regulators) may have access to transaction-level information. Encryption and/or decryption may be performed on each node. In addition, a node may represent an administrator node.

According to an embodiment of the present invention, a bank, third party, regulator or other entity may serve as an administrator node. This node may manage and monitor shared pieces of data that may need to exist across a network platform. According to another example, a regulator may ping (or message) each bank when an audit or other inquiry is needed as opposed to accessing the network. An administrator node may control permissions associated with the network. For example, the administrator node may maintain a whitelist of nodes that can exchange information and perform other actions.

As shown in FIG. 2, an embodiment of the present invention may facilitate the exchange of payment related details and inquiries between two or more participants as to relates to a payment or potential payment and a compliance inquiry. A payment review process may trigger a compliance inquiry, as shown by 226 through Correspondent Bank 220. Correspondent Bank 220 may request data from Beneficiary Bank 222. Network 202 may validate the request per agreed terms and further maintain encrypted, time-stamped records for permissioned parties. The inquiry response may be routed back to Corresponding Bank 220 through Network 202 using secure permission based protocols. Beneficiary Bank 222 may receive requests, access bank's encrypted data and respond to inquiries, e.g., name, date-of-birth, etc. Other data attributes may include account status, name, address details, name matching conditions, currency, account open date, account activity factors, etc. Network 202 enables a peer to peer exchange of information, thereby expediting the time to process queries and settlement payments. In addition, Network 202 facilitates the exchange of information between a participant processing a payment or potential payment and another network participant that is servicing an account under query. Correspondent Bank 220 may receive information and make a determination to proceed, further investigate or hold. The network illustrated in FIG. 2 provides various benefits relating to customer experience, security, automated integration, verified information, information exchange associated with underlying transaction. For example, an embodiment of the present invention reduces inquiry turn-around times, payment delays and client engagement. The system further provides enhanced security of personal information across a secure encrypted network; systematic data exchange that eliminates manual processes and reduced costs; leverages institutionally sourced and validated customer and customer information and exchange of information and communication about in-process transactions.

The network of FIG. 2 provides real-time access to data to integrate into banking systems/operations in order to improve efficiency (e.g., drive STP, reduce errors, delays); platform and infrastructure that provides back-office services to participants and services to enable the trust of counter-parties or systems without in-house due-diligence demands. Moreover, the network provides peer-to-peer movement, streamlined messaging, liquidity management, active risk/compliance management and shared utilize functions.

The network of FIG. 2 further creates a global distributed network that allows for a seamless, interconnected flow of money eliminating the need for multiple banks. Blockchain enables creation of a global interconnected network without the need for multiple intermediaries, while enhancing transparency of the end to end flow. Information may be encrypted and shared privately among two or more participants within a network of nodes. In addition, shared utility functions move redundant processes (e.g., sanctions, compliance, validations, etc.) to the network level, enabling faster execution at lower costs. The real-time interconnected network enables informed, real-time risk management.

Figure 3:
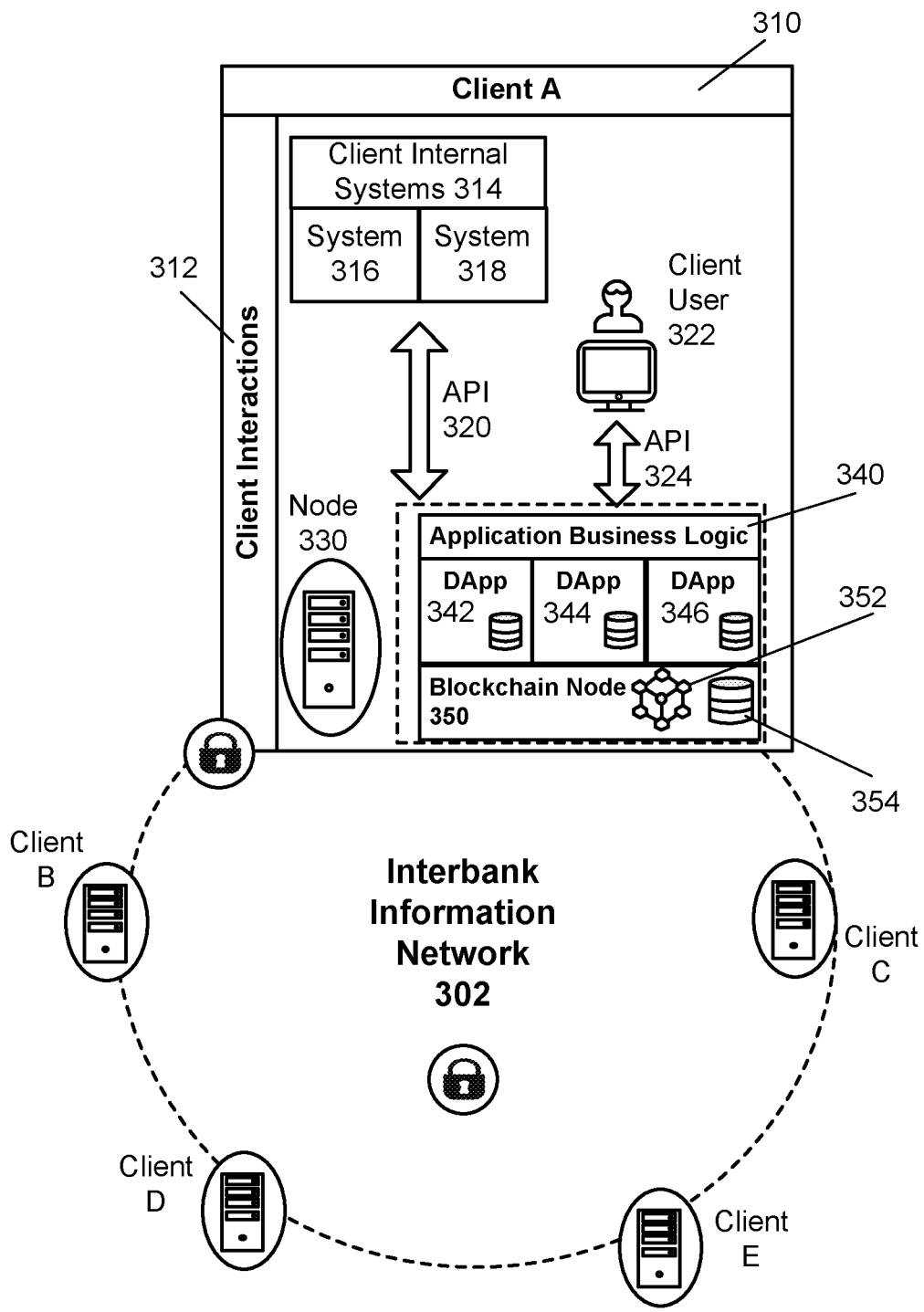
FIG. 3 is an exemplary diagram that illustrates a logical view of a node of an Interbank Information Network, according to an embodiment of the present invention.

FIG. 3 is an exemplary diagram that illustrates a logical view of a node of an Interbank Information Network, according to an embodiment of the present invention. As shown in FIG. 3, Network 302 may include various nodes, representing banks, financial institutions and other entities. Node 310 represents Client A. Client A may represent a bank, for example. Node 310 may include a client interactions system 312. Client environment may include Client Internal Systems 314 with client business systems represented by 316 and 318. These systems may communicate to Application Business Logic 340 via API 320 as well as Client User 322 through API 324. Application Business Logic 340 may communicate with decentralized applications (e.g., payments compliance inquiry, etc.) and corresponding databases represented by 342, 344 and 346. Blockchain Node 350 may support a permissioned shared ledger 352 and private database 354, which may contain transactional, customer and PI data. For example, each node may retain a full copy of information on the ledger to which they are privy.

An embodiment of the present invention implements ledger posting on the Interbank Information Network. Additional details of shared ledger posting are provided in commonly owned and currently pending application U.S. patent application Ser. No. 15/797,602, filed Oct. 30, 2017, which claims priority to U.S. Provisional Application 62/414,398, filed Oct. 28, 2016, the contents of which are incorporated by reference herein in their entirety.

The network and IIN platform may be accessed through a secure web-interface or through a secure API integration into banking applications or services. The network may apply a two-way SSL for web-interface and API with independent web-application deployment for each participant that may include access to web-interface restricted to white-listed IP addresses only for approved and onboarded participants as well as approved participants and users will leverage log-in credentials to access UI and certificates/keys for API. Node access keys may be secured in a key-vault that is accessible per the process as defined by the network operating model.

As shown in FIG. 3, a network participant, such as Client A, may secure a connection to Network 302 and applications via a web-interface or API. Client A may access enrolled business applications to inquire/request information. Blockchain node 350 may validate, check permissions and obtain consensus. Blockchain node 350 may record and publish inquiry activity (e.g., hash) onto the public ledger 352, which may then be replicated on each node. Blockchain node 350 may deliver private inquiry details to permissioned participants' secure private store. A receiving network participant, such as Client B, may respond by securing a connection to network 302 and applications via a web-interface or API to review the request and action accordingly. A corresponding blockchain node may then deliver private inquiry details to permissioned participants' secure private store. Network participant, such as Client A, may then receive the inquiry response and action accordingly.

The Interbank Information Network represents a technology platform designed to increase the efficiency of payment related processes and queries by providing an alternative communication channel to exchange payment and customer related information in a peer to peer model through a blockchain based platform. The platform enables any network participant to communicate and exchange queries and information directly with any other network participant on the network utilizing the network connectivity and application models. For example, Participant A may communicate to send/receive queries/data with Participant B and/or Participant C. Participant B may communicate to send/receive queries/data with Participant A and/or Participant C. Participant C may communicate to send/receive queries/data with Participant A and/or Participant B.

According to an embodiment of the present invention, the Interbank Information Network may leverage a core blockchain based technology to achieve security, resiliency, consensus and immutability. Each client technology asset may be deployed in its own virtual private network and server infrastructure. For example, a single hosting model may utilize a dedicated private third-party infrastructure established for network participants. The nodes may be hosted by a third party hosting provider at a data center. The IIN platform may support a variety of hosting models based on a participant's preference (e.g., on-premise, third party, public-cloud, private-cloud, etc.).

FIG. 3 may further represent a cloud-based network or physical/virtual infrastructure where each bank represents a node in the network. According to an exemplary application, the network may be layered on a blockchain platform. Each bank node may be connected through an API or secure integration layer to that bank's particular node representation in the network. With the blockchain platform, each bank node may share information privately, without an intermediary or data management provider. Accordingly, each bank node may connect directly and therefore receive and/or access data from another bank node to perform validation, fraud, sanction, tracking, etc. The blockchain platform enables a bank node to send encrypted information directly to a particular bank node. The network verifies messages from a bank node to another bank node. An embodiment of the present invention is directed to securely sharing sensitive information between bank nodes. FIGS. 2 and 3 illustrate an exemplary node configuration. Other node configurations may be implemented to address various scenarios, applications and situations.

According to the various embodiments of the present invention, exemplary use cases may include validation and fraud; sanctions inquiries and payment tracking. For example, the innovative network provides valid account acknowledgement with beneficiary name/address validations/enrichment reduces payment delays and returns as well as complete, valid name, address. The innovative network provides proactive validation against network wide fraudster list. The network reduces fraud payments by leveraging network wide fraudster lists shared in real-time. The innovative network provides fast and efficient sanctions inquiry information leveraging a bank's client information system (CIS) or other system that contains client information. For example, each node may maintain a corresponding sanction list (or other information). According to another embodiment, the network may maintain a single sanction list that may be accessed by any node in the network. According to yet another example, each node may maintain a portion of the sanction list. Other variations may be implemented. The network further reduces payment delays and achieves faster clearing of false positives. The network enables automated inquiry resolution by leveraging standardized messaging and data model for key data elements. The innovative network provides real time access to payment stages across related banks and further provides proactive management of payment tracking inquiries.

Information may be shared in parallel to existing external messaging and settlement networks to ensure in-bank reconciliation. Each node may be responsible for in-bank user access to node functions. The network maintains a list of nodes that may participate in network. Information may be populated in various ways by banks, via transaction reference data (e.g., enhanced real-time control validation data, etc.); non-transaction reference data (e.g., fraud attach list, account reference, etc.) and/or other means.

An embodiment of the present invention may process and share different classifications of data. For example, the network of an embodiment of the present invention may receive data based on a pull request or push request. A pull request may include a request for information to a bank node. A push request may include a situation where a node maintains preemptive populated data that is provided in anticipation of a request. Another classification of data may include whether a node is sharing content or an acknowledgement. For example, a bank node may request an account number. A responding node may provide the content, e.g., account number. An acknowledgement may involve a bank node requesting confirmation or acknowledgement of an account number.

Figure 4:
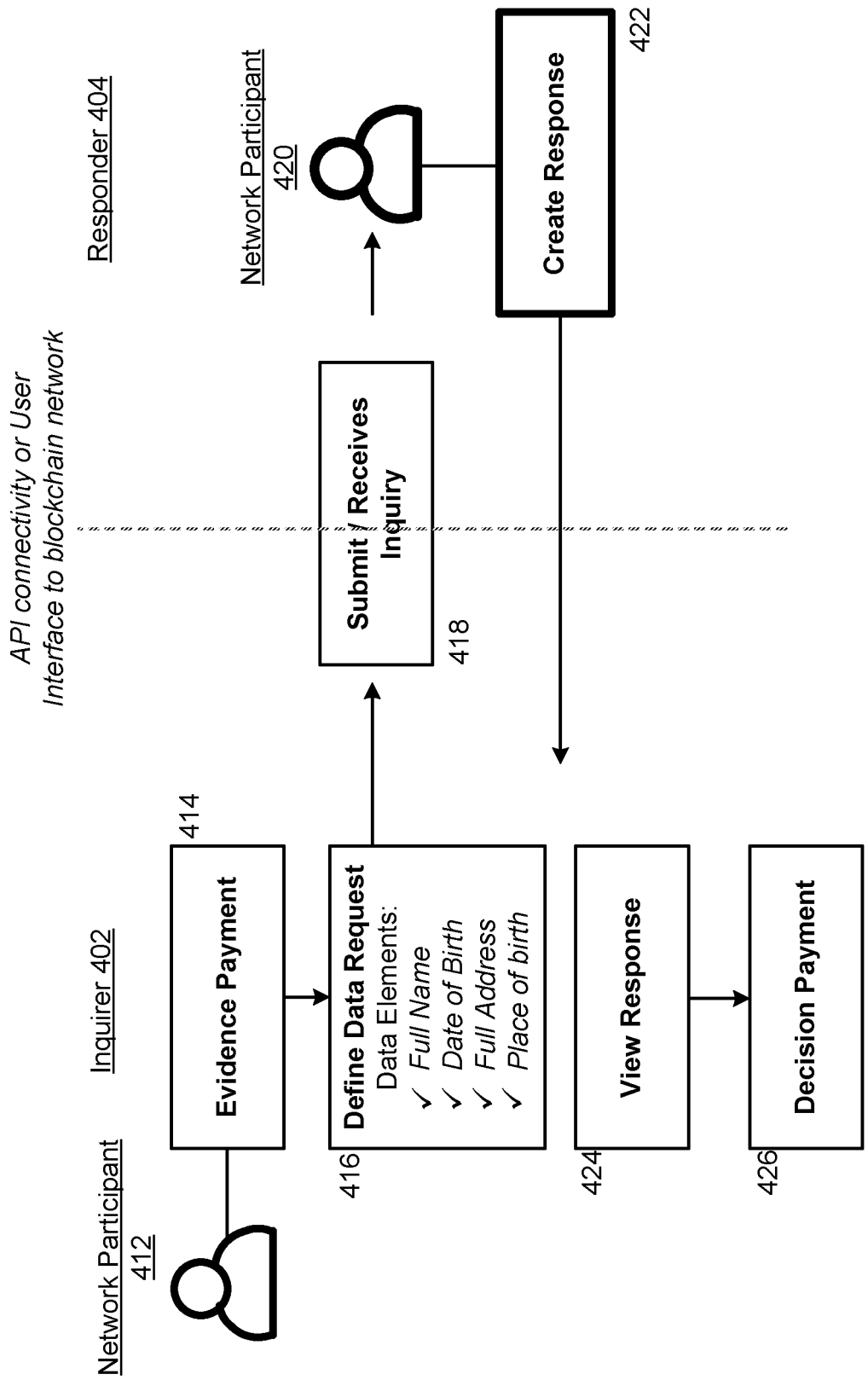
FIG. 4 is an exemplary flow diagram of an inquiry process, according to an embodiment of the present invention.

FIG. 4 is an exemplary flow diagram of an inquiry process, according to an embodiment of the present invention. FIG. 4 illustrates an exemplary interaction between an inquirer and a responder. Communication may be provided by API connectivity or user interface to a blockchain network. Network Participant 412 may submit an evidence of payment at 414. Data elements may be defined, at step 416. Data elements may include full name, date of birth, full address, place of birth, etc. The inquiry may be submitted and received by Network Participant 420, at step 418. Network Participant 420 may then create a response, at step 422. Network Participant 412 may then view the response, at step 424 and then render a decision at 426.

Figure 5:
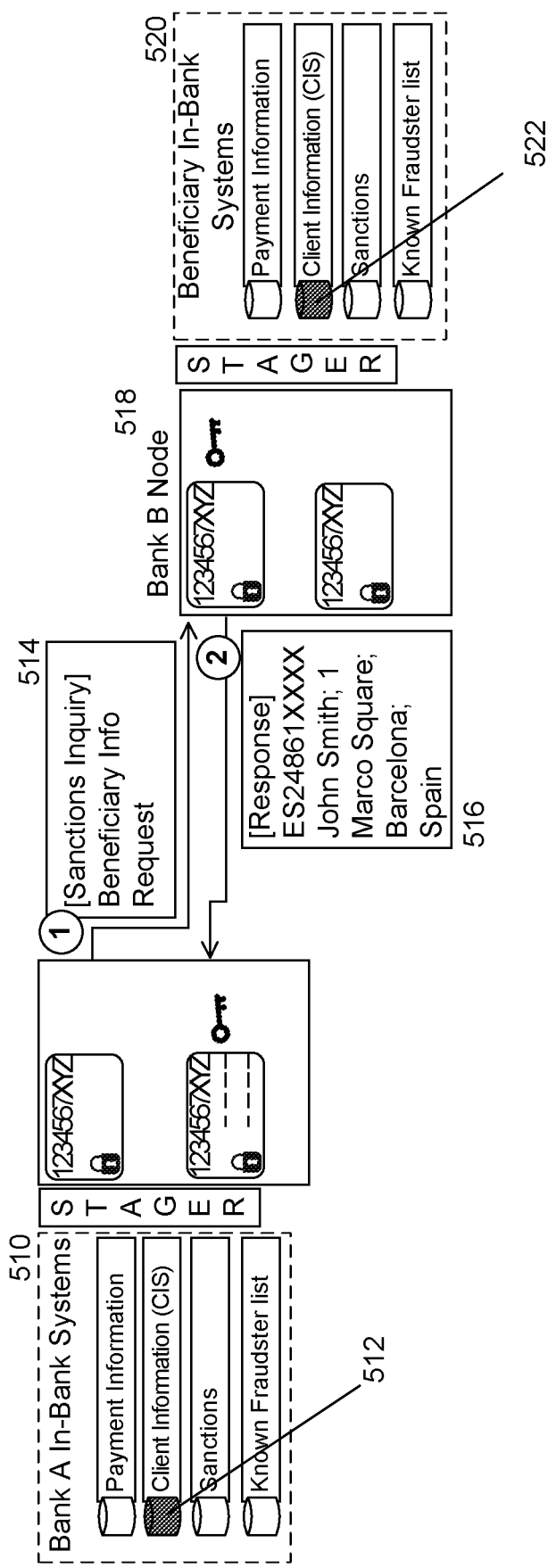
FIG. 5 is an exemplary diagram that illustrates sanctions inquiry and information gathering process, according to an embodiment of the present invention.

FIG. 5 is an exemplary diagram that illustrates sanctions inquiry and information gathering process, according to an embodiment of the present invention. As shown in FIG. 5, Bank A 510 may send a private message such as a sanctions inquiry may be shared. Bank A may maintain various applications, systems and/or databases, including a customer information application 512. The message may include a request for beneficiary information, as shown by 514. A receiving node, Bank B Node 518, may receive the request and perform the requested process. For example, a stager of Bank B Node may modify the request and represent the request as a smart contract. The stager may represent an API or secure communication layer. The smart contract captures business logic and initiates the specific request accordingly. In this example, the stager of a receiving node may receive the inquiry and then retrieve the requested information using client information application 522 maintained by Beneficiary System 520. As shown in FIG. 5, a private message may be sent from a Bank B Node 518 to Bank A 510. The response, as shown by 516, may include an account holder's name, address, etc. FIG. 5 illustrates a secure process for receiving and responding to a sanctions inquiry in accordance with an embodiment of the present invention.

Figure 6:
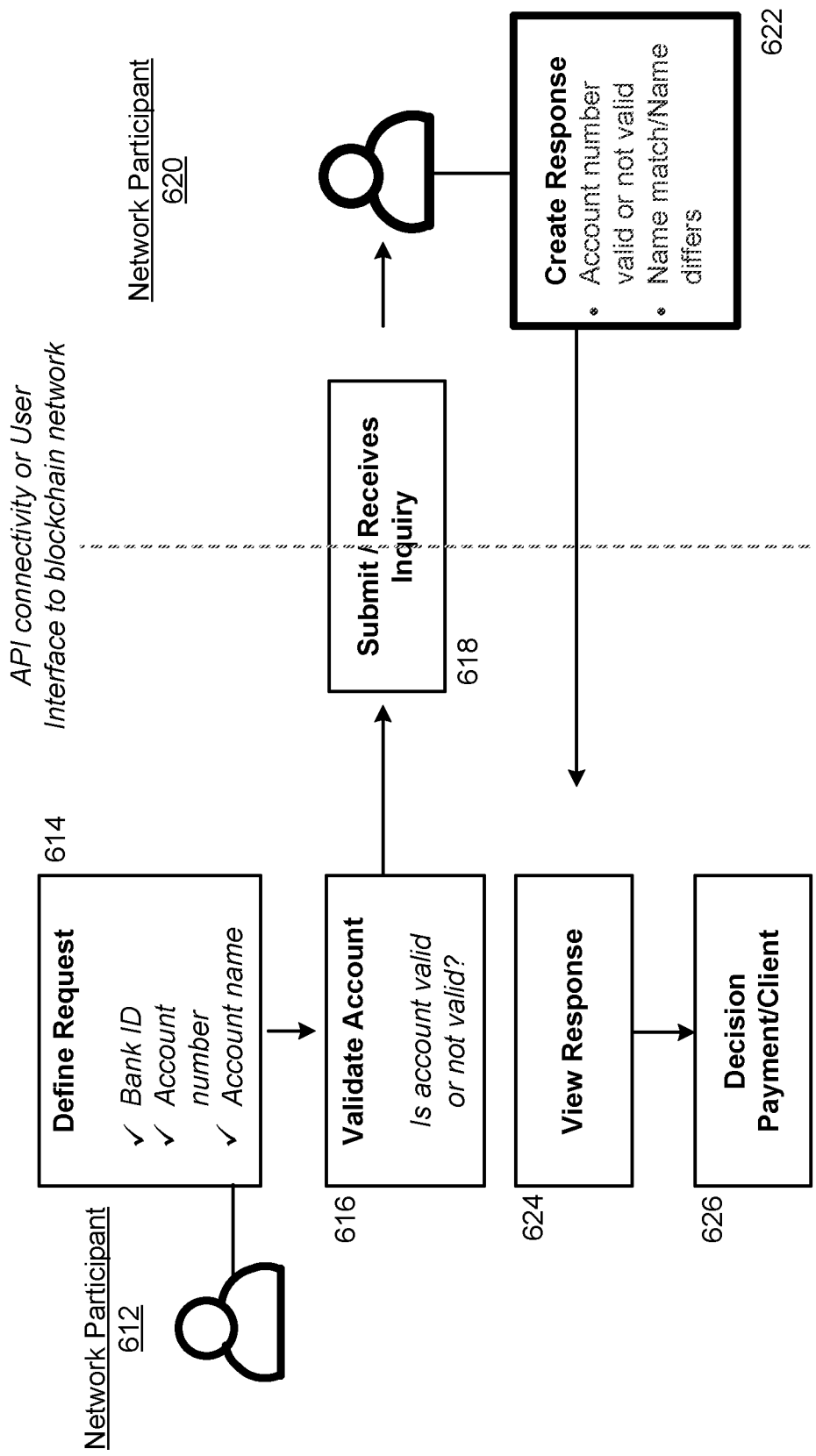
FIG. 6 is an exemplary flow diagram of an account validation process, according to an embodiment of the present invention.

FIG. 6 is an exemplary flow diagram of an account validation process, according to an embodiment of the present invention. FIG. 6 illustrates an exemplary interaction between an inquirer and a responder. Communication may be provided by API connectivity or user interface to a blockchain network. Network Participant 612 may submit a request at step 614. The request may be an account validation, e.g., whether an account is valid or not, as shown by 616. The inquiry may be submitted and received, at step 618. Network Participant 620 may then create a response, at step 622. The response may include whether the account number is valid or not and whether the name is a match or the name differs in what respect. Network Participant 612 may then view the response, at step 624 and then render a decision at 626.

Figure 7:
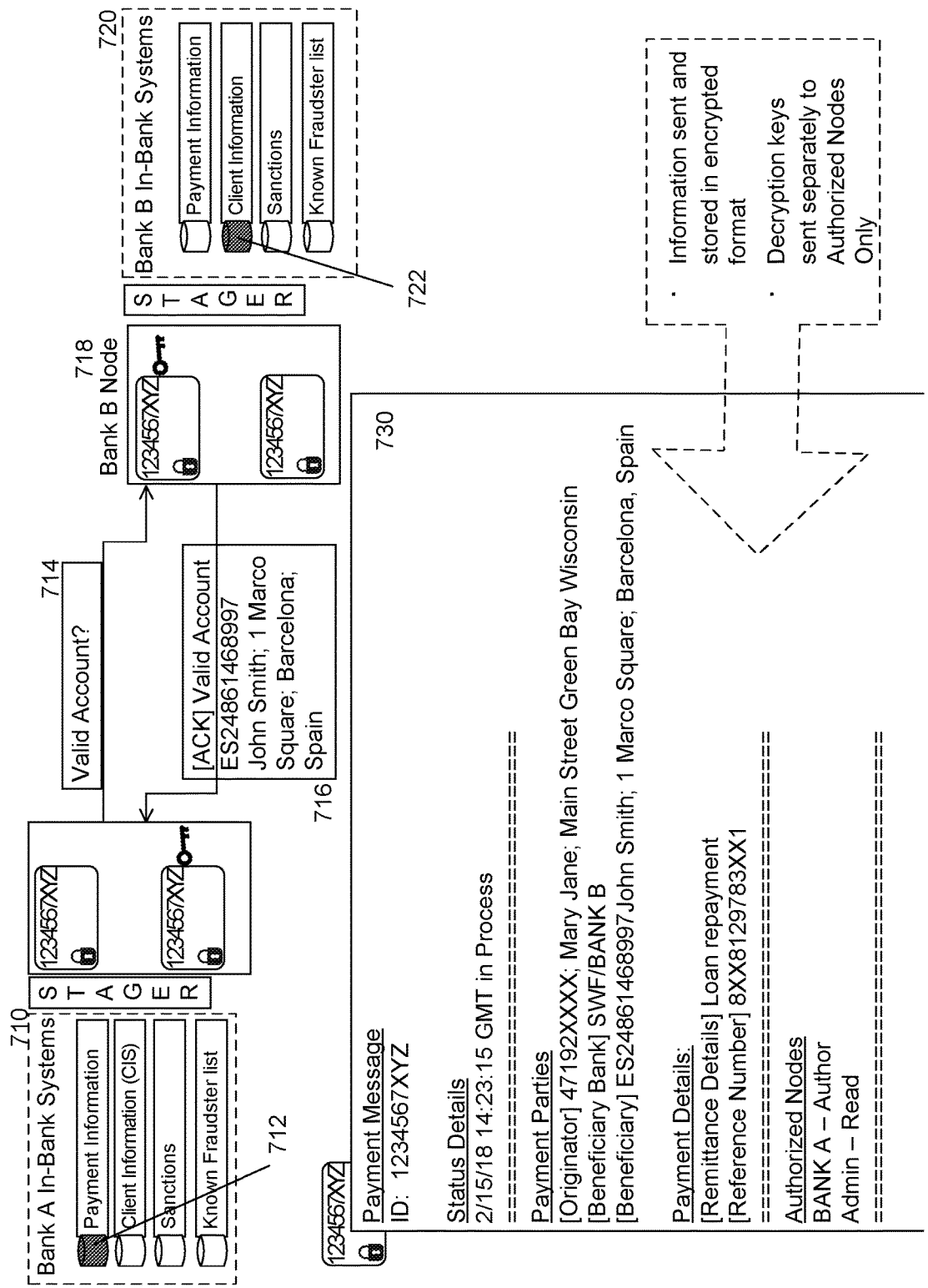
FIG. 7 is an exemplary illustration of a validation use case, according to an embodiment of the present invention.

FIG. 7 is an exemplary illustration of a validation use case, according to an embodiment of the present invention. Bank A 710 through payment information application 712 may request account validation from another bank, represented by Bank B Node 718. Upon receiving request 714, Bank B Node 718 may access client information application 722 and generate a response as shown by 716. An exemplary detailed payment message is shown at 730. The information is sent and stored in an encrypted format. Decryption keys may be sent separately to Authorized Nodes.

Figure 8:
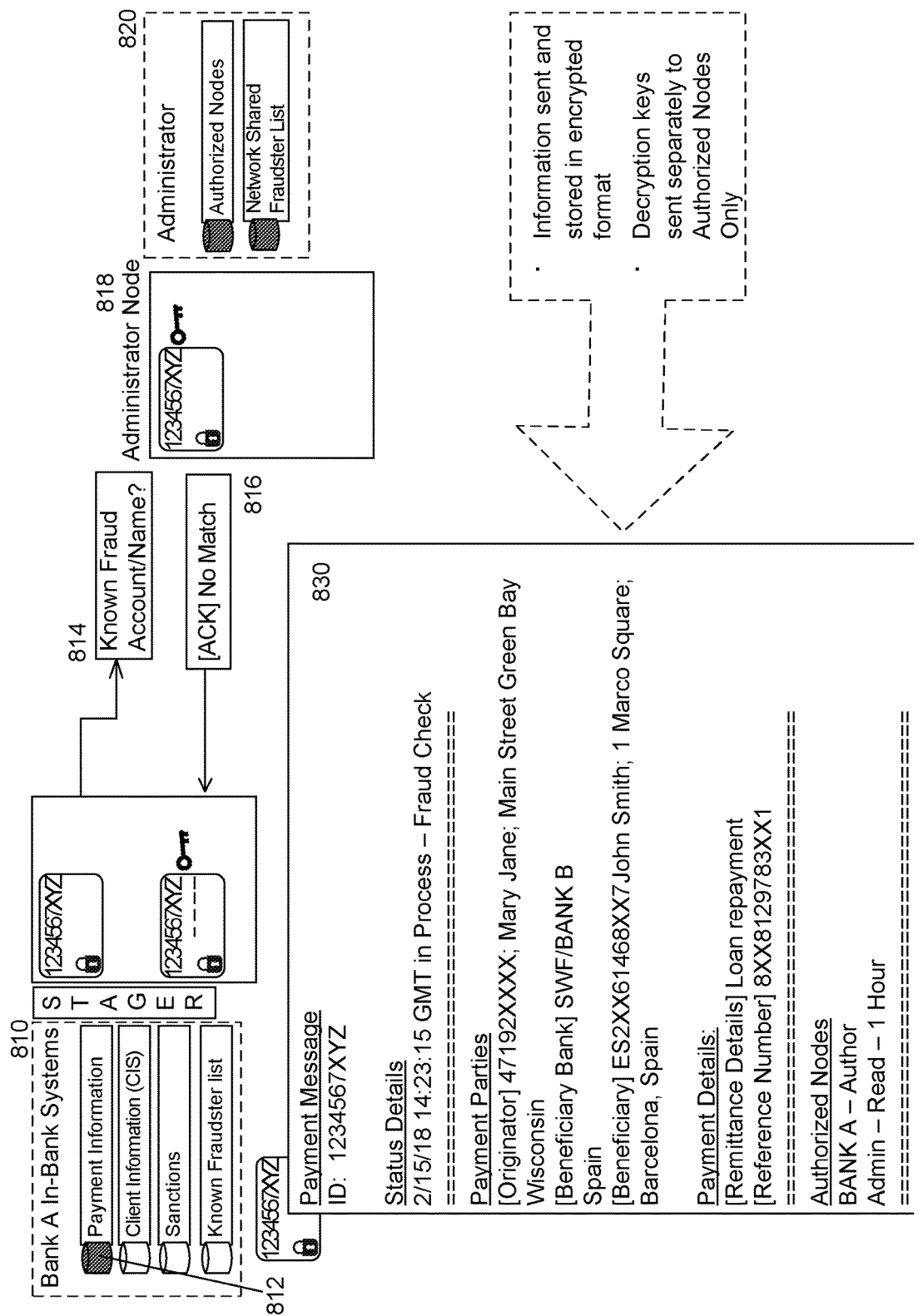
FIG. 8 is an exemplary illustration of a fraud check use case, according to an embodiment of the present invention.

FIG. 8 is an exemplary illustration of a fraud check use case, according to an embodiment of the present invention. As shown in FIG. 8, an embodiment of the present invention is directed to fraud check, beneficiary account validation and address enrichment within the Interbank Information Network of an embodiment of the present invention. In the exemplary fraud use case, information is sent and stored in an encrypted format. Decryption keys may be sent separately to Authorized Nodes. Bank A 810 through payment information application 812 may request fraud information from an administrator node, represented by 818. Upon receiving request 814, Administrator 818 may access authorized nodes and network shared fraudster list and generate a response as shown by 816. An exemplary detailed payment message is shown at 830.

Figure 9:
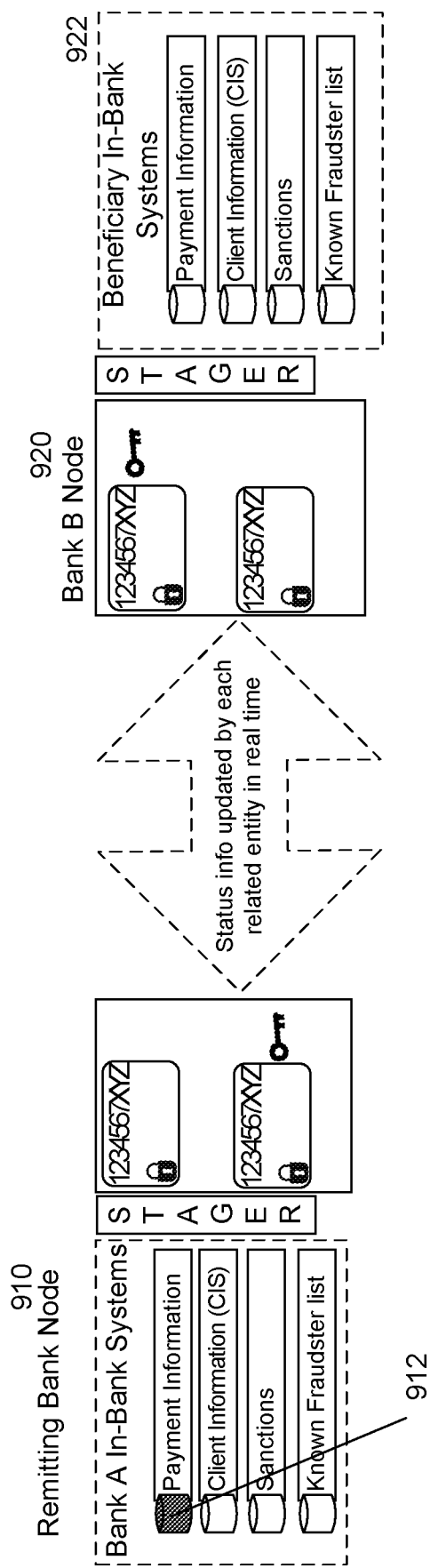
FIG. 9 is an exemplary payment tracking, according to an embodiment of the present invention.

FIG. 9 is an exemplary payment tracking, according to an embodiment of the present invention. As shown in FIG. 9, status information may be updated by each related entity in real-time. Bank A 910 through payment information application 912 may request status information from another bank, represented by Bank B 920. Upon receiving a request, Beneficiary Bank 922 may provide a status response in real time.

Additional applications may include validation, optimization, liquidity, foreign exchange (FX), tokens, invoicing, service level agreement (SLA) tracking and agreements and intraday reporting. For validation, an embodiment of the present invention may determine whether an account is real, open or closed; determine how long an account has existed; name and account match; perform integration with early warning services (EWS) and other directories for low value payments; integration with eWallets, payment risk score service, etc.

According to an exemplary illustration, a corporate entity may connect to a number of e-wallet applications. For example, a corporate entity may initiate a payment from an online payment system in the US to mobile payment application in China. The Interbank Information Network of an embodiment of the present invention may facilitate payment between the online payment system and the mobile payment application.

For optimization, an embodiment of the present invention may perform optimized payment routing; Financial Action Task Force (FATF) enrichment, integration with a workflow case management tool, and consideration of factoring and future dated payment.

For liquidity, an embodiment of the present invention may be applied to Nostro account management by client and by account; Nostro account visibility and optimization, and shadow balances on chain for liquidity management. A Nostro account generally refers to an account that a bank holds in a foreign currency in another bank.

For foreign trades, an embodiment of the present invention may provide visibility into current bank rates for a transaction, FX contracts with markets, intelligent FX routing and FX netting.

For tokens, an embodiment of the present invention may issue tokens to track use of value added services (VAS) or apps; issue tokens to bill and collect revenue for use of VAS and apps and further create a mechanism, e.g., corporate coin solution, that allows corporates to track payments across their subsidiaries and accounts.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, the various embodiments of the present invention support a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, and/or JavaScript. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices 120, 130 or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although, the examples above have been described primarily as using a software application ("app") downloaded onto the customer's mobile device, other embodiments of the invention can be implemented using similar technologies, such as transmission of data that is displayed using an existing web browser on the customer's mobile device.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A system that implements a secure and decentralized network, the system comprising:
    a first bank node of a distributed ledger network, wherein the first bank node is communicatively coupled to a first in-bank system;
    a second bank node of the distributed ledger network, wherein the second bank node is communicatively coupled to a second in-bank system; and
    an interbank information network that is layered on top of the distributed ledger network, wherein the interbank information network establishes a direct communication channel between the first node and the second node, wherein the interbank information network encrypts each communication sent between the first and second nodes and further sends a decryption key for each communication in a separate communication from the encrypted communication after authorizing the intended recipient node, and wherein the interbank information network obtained the decryption key from a secured key-vault;
    wherein the first bank node is configured to:
        secure a connection to the distributed ledger network via an application programming interface (API), wherein the secure connection to the distributed ledger network applies a two-way Secure Sockets Layer (SSL) for a web-interface and the API;
        receive inquiry activity comprising payment instructions to make a payment to a second bank node that is part of the interbank information network;
        check, through a blockchain node for the first bank node, permissions for the payment instructions;
        validate, through the blockchain node for the first bank node, permissions for the payment instructions;
        obtain consensus on the distributed ledger network associated with the interbank information network, through the blockchain node for the first bank node, for the payment instructions;
        record and publish, through the blockchain node for the first bank node, a hash that represents the inquiry activity, onto a public ledger for the distributed ledger network associated with the interbank information network;

send one or more private inquiry details comprising an inquiry message to the second bank node over the distributed ledger network;

receive, from the second bank node, a response to the inquiry message over the distributed ledger network, wherein the second bank node receives the request message, processes one or more transaction details and generates a response; and process a payment pursuant to the payment instructions and responsive to the response to the inquiry message, wherein the inquiry message comprises a message that requests the second bank node to share client data and the client data comprises an account open date and name matching conditions.

2. The system of claim 1, wherein the client data comprises confirming one or more client details.

3. The system of claim 1, wherein the client data comprises account activity.

4. The system of claim 1, wherein the inquiry message is fraud or risk related.

5. The system of claim 1,
wherein the first bank node is further configured to:
transmit, to the second bank node, a request for status information; and
receive, from the second bank node, a response to the request for status information; and
wherein the second bank node provides the response to the request for status information in real time.

6. A system that implements a secure and decentralized network, the system comprising:
a first bank node of a distributed ledger network, wherein the distributed ledger network is communicatively coupled to a first in-bank system;
a second bank node of the distributed ledger network, wherein the distributed ledger network is communicatively coupled to a second in-bank system; and
an interbank information network that is layered on top of the distributed ledger network, wherein the interbank information network establishes a direct communication channel between the first node and the second node, wherein the interbank information network encrypts each communication sent between the first and second nodes and further sends a decryption key for each communication in a separate communication from the encrypted communication after authorizing the intended recipient node, wherein the interbank information network obtained the decryption key from a secured key-vault, and
wherein the first bank node is configured to:
secure a connection to the distributed ledger network via an application programming interface (API), and wherein the secure connection to the distributed ledger network applies a two-way Secure Sockets Layer (SSL) for a web-interface and the API;
receive inquiry activity comprising payment instructions to make a payment to a second bank node that is part of the interbank information network;
check, through a blockchain node for the first bank node, permissions for the payment instructions;
validate, through the blockchain node for the first bank node, permissions for the payment instructions;
obtain consensus on the distributed ledger network associated with the interbank information network, through the blockchain node for the first bank node, for the payment instructions;

record and publish, through the blockchain node for the first bank node, a hash that represents the inquiry activity, onto a public ledger for the distributed ledger network associated with the interbank information network;
send one or more private inquiry details comprising a request message to the second bank node over the distributed ledger network;
receive, from the second bank node, a response to the request message over the distributed ledger network, wherein the second bank node receives the request message, processes one or more transaction details and generates a response; and
process a payment pursuant to the payment instructions and responsive to the response to the request message,
wherein the inquiry message comprises a message that requests the second bank node to share client data and the client data comprises an account open date and name matching conditions.

7. The system of claim 6, wherein the second bank node implements one or more fraud or risk tools to generate the response.

8. The system of claim 6, wherein the second bank node requests one or more details from a third node.

9. The system of claim 8, wherein the interbank information network:
validates the request for the one or more details; and
maintains an encrypted and time-stamped record of the request for the one or more details.

10. The system of claim 6,
wherein the first bank node is further configured to:
transmit, to the second bank node, a request for status information; and
receive, from the second bank node, a response to the request for status information; and
wherein the second bank node provides the response to the request for status information in real time.

11. A method that implements a secure and decentralized network, the method comprising:
securing a connection to a distributed ledger network via an application programming interface (API), wherein the secure connection to the distributed ledger network applies a two-way Secure Sockets Layer (SSL) for a web-interface and the API, wherein an interbank information network is layered on top of the distributed ledger network, wherein the interbank information network encrypts each communication sent between a first and second node of the distributed ledger and further sends a decryption key for each communication in a separate communication from the encrypted communication after authorizing the intended recipient node, and wherein the interbank information network obtained the decryption key from a secured key-vault;
receiving, at a first bank node, inquiry activity comprising payment instructions to make a payment to a second bank node that is part of the interbank information network, wherein the first bank node is communicatively coupled to a first in-bank system;
checking, through a blockchain node for the first bank node, permissions for the payment instructions;
validating, through the blockchain node for the first bank node, permissions for the payment instructions;
obtaining consensus on the distributed ledger network associated with the interbank information network, through the blockchain node for the first bank node, for the payment instructions;

recording and publishing, through the blockchain node for the first bank node, a hash that represents the inquiry activity, onto a public ledger for the distributed ledger network associated with the interbank information network;

sending, to a second bank node, one or more private inquiry details comprising an inquiry message over the distributed ledger network, wherein the second bank node is communicatively coupled to a second in-bank system and wherein an interbank information network establishes a direct communication channel between the first node and the second node;

receiving, from the second bank node, a response to the inquiry message over the distributed ledger network, wherein the second bank node receives the request message, processes one or more transaction details and generates a response; and processing a payment pursuant to the payment instructions and responsive to the response to the inquiry message, wherein the inquiry message comprises a message that requests the second bank node to share client data and the client data comprises an account open date and name matching conditions.

12. The method of claim 11, wherein the client data comprises confirming one or more client details.

13. The method of claim 11, wherein the client data comprises account activity.

14. The method of claim 11, wherein the inquiry message is fraud or risk related.

15. The method of claim 11, further comprising:
transmitting, from the first bank node, to the second bank node, a request for status information;
providing, by the second bank node, a response to the request for status information in real time; and
receiving, at the first bank node, from the second bank node, the response to the request for status information.

16. A method that implements a secure and decentralized network, the method comprising:
securing a connection to a distributed ledger network via an application programming interface (API), wherein the secure connection to the distributed ledger network applies a two-way Secure Sockets Layer (SSL) for a web-interface and the API, wherein an interbank information network is layered on top of the distributed ledger network, and wherein the interbank information network encrypts each communication sent between a first and second node of the distributed ledger and further sends a decryption key for each communication in a separate communication from the encrypted communication after authorizing the intended recipient node, and wherein the interbank information network obtained the decryption key from a secured key-vault;
receiving, at a first bank node, inquiry activity comprising payment instructions to make a payment to a second bank node that is part of the interbank information network, wherein the first bank node is communicatively coupled to a first in-bank system;
checking, through a blockchain node for the first bank node of the distributed ledger network associated with the interbank information network, permissions for the payment instructions;
validating, through the blockchain node for the first bank node, permissions for the payment instructions;
obtaining consensus on the distributed ledger network associated with the interbank information network, through the blockchain node for the first bank node, for the payment instructions;
recording and publishing, through the blockchain node for the first bank node, a hash that represents the inquiry activity, onto a public ledger for the distributed ledger network associated with the interbank information network;
sending, to a second bank node, one or more private inquiry details comprising a request message over the distributed ledger network, wherein the second bank node is communicatively coupled to a second in-bank system and wherein an interbank information network establishes a direct communication channel between the first node and the second node;
receiving, from the second bank node, a response to the request message over the distributed ledger network, wherein the second bank node receives the request message, processes one or more transaction details and generates a response; and
processing a payment pursuant to the payment instructions and responsive to the response to the request message,
wherein the inquiry message comprises a message that requests the second bank node to share client data and the client data comprises an account open date and name matching conditions.

17. The method of claim 16, wherein the second bank node implements one or more fraud or risk tools to generate the response.

18. The method of claim 16, wherein the second bank node requests one or more details from a third node.

19. The method of claim 18, the method further comprising:
validating, by the interbank information network, the request for the one or more details; and
maintaining, by the interbank information network, an encrypted and time-stamped record of the request for the one or more details.

20. The method of claim 16, further comprising:
transmitting, from the first bank node, to the second bank node, a request for status information;
providing, by the second bank node, a response to the request for status information in real time; and
receiving, at the first bank node, from the second bank node, the response to the request for status information.

* * * * *